L. A. MORGAN.
PUMP OPERATING MECHANISM FOR AUTOMOBILES.
APPLICATION FILED OCT. 15, 1908.
967,654.
Patented Aug. 16, 1910.
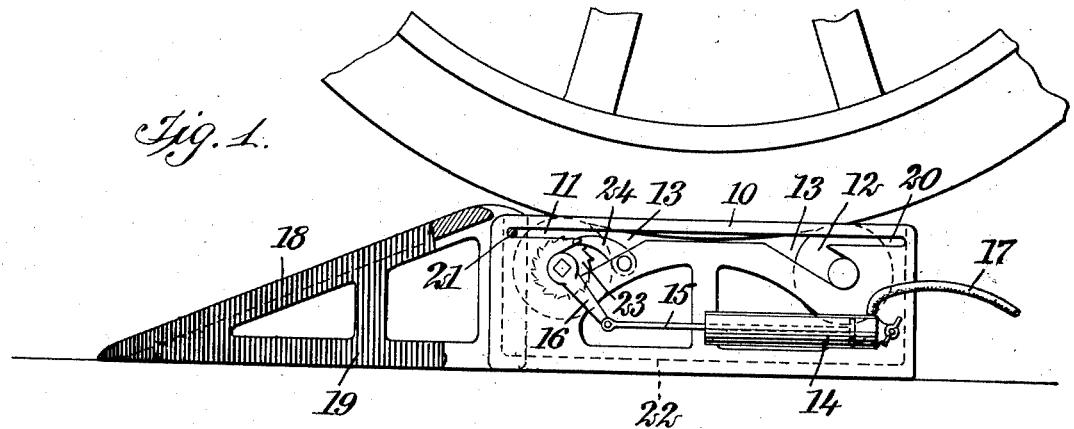
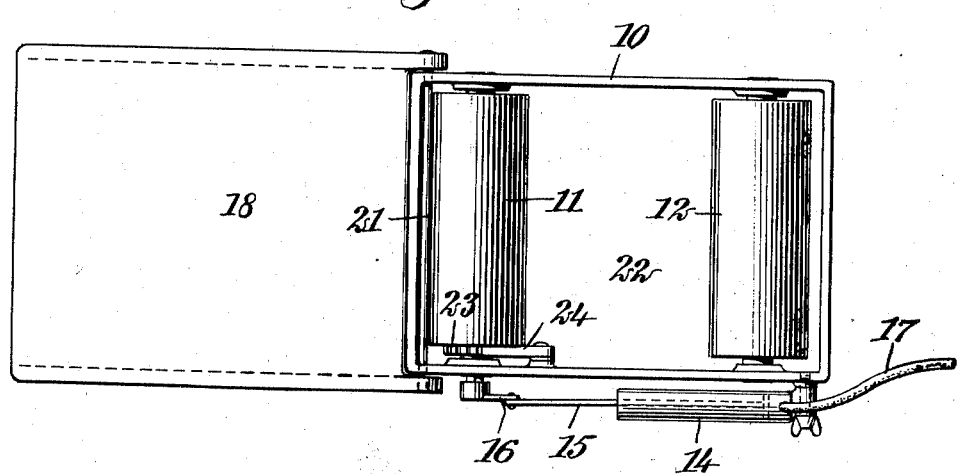
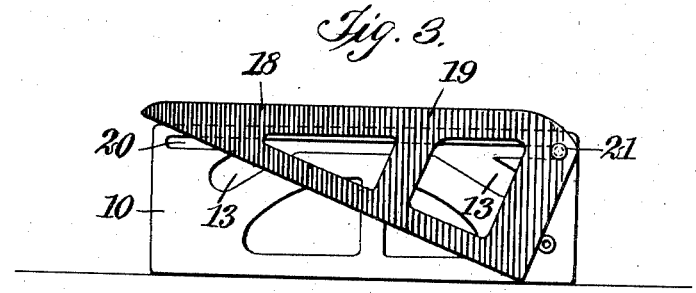
WITNESSES
INVENTOR
Louis A. Morgan
BY
ATTORNEYS

UNITED STATES PATENT OFFICE.

LOUIS ALBERT MORGAN, OF RICHMOND, INDIANA.

PUMP-OPERATING MECHANISM FOR AUTOMOBILES.

967,654.  Specification of Letters Patent.  Patented Aug. 16, 1910.

Application filed October 15, 1908. Serial No. 457,831.

*To all whom it may concern:*

Be it known that I, LOUIS A. MORGAN, a citizen of the United States, and a resident of Richmond, in the county of Wayne and State of Indiana, have invented a new and Improved Pump-Operating Mechanism for Automobiles, of which the following is a full, clear, and exact description.

My invention relates to certain improvements in pumps for use in inflating automobile tires or for general use, and adapted to be operated from the engine of the automobile.

The object of the invention is to provide a simple and convenient mechanism which may be readily carried on the vehicle and which when inserted beneath a single rear wheel thereof may be operated upon the starting of the engine, so that any one of the other three wheels of the vehicle may be inflated, or the pump used for any other purpose desired.

The important advantages of my construction reside in the fact that it is portable; is operated from a single wheel of the machine; may be packed in very small space, and is constructed to permit the vehicle to be readily run up on to it or backed off.

Reference is to be had to the accompanying drawings, forming a part of this specification, in which similar characters of reference indicate corresponding parts in all the figures, and in which—

Figure 1 is a side elevation of the device constructed in accordance with my invention, a portion thereof being broken away; Fig. 2 is a top plan view thereof; and Fig. 3 is a side elevation of the frame in folded position for transportation.

The operating parts of my improved mechanism are mounted within a suitable frame 10, which need be a little wider than the width of an automobile tire and of not more than a foot in length. The opposite sides of the frame serve to support the operating parts of the mechanism, and fastened to one end of the frame is a secondary frame serving as a bridge whereby the vehicle wheel may readily travel up on to the main frame. The operating parts include two rollers 11 and 12, adapted to support the vehicle wheel and be rotated upon the rotation of the latter. The sides of the main frame 10 are provided with two slots 13, extending from adjacent the upper edge downwardly toward the ends of the frame, and these slots serve as bearings for the spindles of the two rollers. The weight of the vehicle resting upon the rollers, tends to spread them apart and hold them in their proper positions, but upon the removal of the vehicle wheel from the rollers, they may both be readily removed from the frame by raising one end of each roller until it passes out of the slot. One of the rollers, as, for instance, the front roller 12, serves merely as an idler and retains the vehicle wheel in engagement with the other roller, whereas the latter serves for the operating of the pump.

The pump is carried by the frame and may be of any suitable form desired. As shown, the pump barrel 14 is pivoted to one side of the frame, and the piston rod 15 is connected to a crank 16 at the end of the spindle of the roller 11. The pump illustrated is a simple single-acting pump having a hose 17, through which compressed air may be delivered for inflating the tires of the machine.

The pump in itself constitutes no portion of the invention, and it is evident that a double-acting air pump or a water pump could be used equally as well. If a water pump is used, it could serve for delivering a stream of water to wash the machine, or fill the radiator, or if an air pump is used, it could be employed for pneumatically cleaning the cushions, as well as for inflating the tires.

To enable the vehicle to easily reach a position with one rear wheel upon the rollers 11 and 12, I provide an auxiliary frame 18, having an inclined surface serving as a bridge to the top of the main frame. The side walls 19 of the auxiliary frame are triangular in form, and are spaced apart a distance slightly greater than the distance between the side walls of the main frame. The two frames are hinged together and preferably in such a manner that the two may be brought together to occupy the minimum space. As illustrated, the side members of the main frame are provided with a slot 20, extending longitudinally thereof and parallel to the upper edge, and the auxiliary frame or bridge is secured to the main frame by a bolt 21, extending through the opposite sides 19 of the auxiliary frame and through the slot 20. The main frame constitutes a receptacle and is provided with a bottom 22. The rollers and pump may be readily removed and placed loosely within said receptacle and the auxiliary frame may be moved from the position indicated in Fig. 1 to the position indicated in Fig. 3, to constitute a cover.

With the parts in operative position, as shown in Fig. 1, and placed in front of one of the rear wheels of a motor vehicle, the vehicle may be driven forward by its own power until one rear wheel reaches the position indicated in Fig. 1. The vehicle will no longer advance, as the wheel resting upon my improved device may freely rotate at twice its former speed, while the other rear wheel remains stationary due to the presence of the differential gearing employed in all automobiles.

All of the power of the engine will be utilized in operating the pump, and the latter may be used for any purpose desired, as, for instance, inflating the tires, cleaning the cushions, or pumping water.

In order to facilitate the backing of the vehicle off the frame, the rear roller 11 is preferably provided with a ratchet wheel 23, having engagement with a pivoted dog 24, supported on the inner side of the main frame. This permits the roller to be rotated in one direction but prevents its rotation in the opposite direction. When it is desired to back the vehicle off the device, the reverse gearing is automatically thrown in operation and the rotation of the vehicle wheel in the opposite direction permits it to readily pass over the rear roller and down the inclined bridge.

Having thus described my invention, I claim as new and desire to secure by Letters Patent:

1. A device of the class described, comprising a main frame in the form of a receptacle or container, a pump supported thereby, a roller supported by said frame and operatively connected to said pump and adapted to be operated by a motor vehicle wheel, and a cover for said receptacle, adapted to serve also as a bridge to said receptacle.

2. A device of the class described, comprising a portable frame, a pump and operating mechanism carried by said frame, said frame having a slot extending longitudinally thereof, an auxiliary frame having an inclined surface constituting a bridge to said main frame, and means extending through said slot for connecting said auxiliary frame and said main frame and permitting their relative movement.

3. A device of the class described, comprising a main frame, a roller and a pump detachably secured thereto, means for operating said pump from said roller, said roller and said pump being adapted to be stored within said frame during transportation, and a cover for said frame, also serving as an inclined approach to said roller.

4. A device of the class described, adapted to be operated by a single wheel of a motor vehicle, comprising a main frame, an inclined bridge pivoted thereto, a pair of rollers rotatably mounted within said main frame, and a pump adapted to be operatively connected to one of said rollers.

5. A device of the class described adapted to be operated by a single wheel of a motor vehicle, comprising a frame, two parallel rollers mounted within said frame and serving to directly support the vehicle wheel, a pump secured to said frame and operatively connected to one of said rollers, and means for preventing the rotation of said last-mentioned roller in one direction.

6. A device of the class described, comprising a main frame adapted to rest upon the ground, a pump carried thereby, operating mechanism carried by said frame and adapted to be operated by a vehicle wheel to drive said pump, said pump and operating mechanism being detachable from said frame and adapted to be stored therein, and an auxiliary frame serving as a cover for said main frame and also adapted to serve as a bridge to said main frame, whereby a vehicle wheel may be rolled on to the latter.

7. A device of the class described, comprising a portable main frame adapted to rest upon the ground, a pump, a roller carried by said frame and operatively connected to said pump and adapted to support a vehicle wheel and be operated thereby when said wheel is rotated in one direction, and means for preventing the rotation of said roller in the opposite direction to facilitate the movement of the vehicle wheel out of engagement with the roller.

8. A device of the class described, comprising a portable main frame adapted to rest upon the ground, two parallel rollers carried by said frame and adapted to support a single motor vehicle wheel and be rotated thereby, a pump including a cylinder pivotally connected to said frame and a piston, operative connections for reciprocating said piston upon the rotation of one of said rollers, and an inclined bridge pivotally connected to said frame adjacent one end thereof and movable to a position over said frame.

9. A device of the class described, comprising a portable main frame adapted to rest upon the ground, two parallel rollers carried by said frame and adapted to support a single motor vehicle wheel and be rotated thereby, a pump carried by said frame, operative connections between one of said rollers and said pump, and an inclined bridge pivotally connected to said frame adjacent one end thereof and movable to a position over said frame.

10. A device of the class described, comprising a main frame having oppositely-disposed side walls and a bottom wall and an open top, rollers within said frame and extending across the same and having their opposite ends supported by the side walls of said frame, a bottom carried by said frame and operatively connected to one of said rollers, and an inclined wall terminating adjacent the top of said main frame.

11. A device of the class described, comprising a main frame, adapted to rest upon the ground, a pump carried by said frame, two parallel rollers within the frame and adapted to support a single motor vehicle wheel and be rotated thereby, operative connections between one of said rollers and said pump, an inclined wall for directing said motor vehicle wheel on to said rollers and terminating adjacent one of said rollers, and means for preventing the rotation of said last-mentioned roller in one direction.

In testimony whereof I have signed my name to this specification in the presence of two subscribing witnesses.

LOUIS ALBERT MORGAN.

Witnesses:
H. E. WILLIAMS,
RAYMOND WHITE.